United States Patent [19]

Maeda

[11] 4,232,568
[45] Nov. 11, 1980

[54] OUTPUT SPLIT-TYPE MECHANICAL AND HYDRAULIC TRANSMISSION

[75] Inventor: Hiroaki Maeda, Toyota, Japan

[73] Assignee: Aisin Seiki Kabushiki Kaisha, Kariya, Japan

[21] Appl. No.: 810,790

[22] Filed: Jun. 28, 1977

[30] Foreign Application Priority Data

Jul. 6, 1976 [JP] Japan ................................. 51/80619

[51] Int. Cl.² .......................................... F16H 47/04
[52] U.S. Cl. .................................................. 74/687
[58] Field of Search ................. 74/687, 688, 689, 690, 74/691

[56] References Cited

U.S. PATENT DOCUMENTS

| | | | |
|---|---|---|---|
| 3,667,321 | 6/1972 | Maurice | 74/687 X |
| 3,714,845 | 2/1973 | Mooney, Jr. | 74/687 |
| 3,722,324 | 3/1973 | Cordner et al. | 74/687 |
| 3,783,711 | 1/1974 | Orshansky, Jr. | 74/687 |
| 3,861,240 | 1/1975 | Nolan et al. | 74/687 |
| 3,888,139 | 6/1975 | Orshansky, Jr. | 74/687 |
| 4,008,628 | 2/1977 | Orshansky, Jr. | 74/687 |

*Primary Examiner*—Leslie Braun
*Attorney, Agent, or Firm*—Finnegan, Henderson, Farabow, Garrett & Dunner

[57] ABSTRACT

An output split-type mechanical and hydraulic transmission includes input, intermediate, and output shafts, differential gear mechanisms for establishing different input-output speed ratios, clutch mechanisms for selectively cooperating with components of the differential gear mechanisms and the input, intermediate, and output shafts to establish different input-output speed ratio ranges, and first and second hydraulic pump motors. The first pump motor has a variable hydraulic capacity and is mechanically and driveably connected to the input shaft for establishing variations in the hydraulic capacity. The second pump motor is mechanically connected to at least one component of the differential gear mechanisms for establishing rotational speeds of the components of the differential gear mechanisms during the different input-output speed ratio ranges in relationship to the variations o the first pump motor's hydraulic capacity. A first differential gear mechanism includes at least four elements, the first element being connected to the input shaft, the second element being connected to the second pump motor, and the third and fourth elements being selectively engageable with the intermediate shaft. A second differential gear mechanism includes at last three elements, the first element being connected to the input shaft, the second element being connected to the intermediate shaft, and the third element being connected to the output shaft.

25 Claims, 8 Drawing Figures

OUTPUT SPLIT-TYPE MECHANICAL AND HYDRAULIC TRANSMISSION

BACKGROUND OF THE INVENTION

This invention relates to an output split-type mechanical and hydraulic power transmission.

More particularly, this invention relates to an output split-type mechanical and hydraulic power transmission having a plurality of input-output speed ratio ranges.

In a conventional output split-type mechanical and hydraulic transmission utilizing a single input-output speed ratio range, the required horsepower capacity for a hydraulic pump motor used in the transmission is large. Because of this, conventional power transmissions of this type are severely limited in a practical sense, i.e., the transmission is extremely expensive to manufacture, is large in size, and has a low power efficiency.

To attain the wide variation of speed changes required in automotive vehicles, conventional power transmissions have used a plurality of input-output speed ratio ranges. However, even when output split-type mechanical and hydraulic transmissions have incorporated the use of a plurality of input-output speed ratio ranges, no completely satisfactory results have been achieved and numerous problems have been encountered in meeting the necessary conditions and requirements. It is necessary that an output split-type mechanical and hydraulic transmission not only employ a plurality of input-output speed ratio ranges but also be small in size and low in manufacturing cost, have maximum power efficiency, and allow a high degree of design flexibility to meet the input-output speed ratio ranges requirements.

Accordingly, it is a primary object of this invention to provide a new and improved output split-type mechanical and hydraulic transmission employing a plurality of input-output speed ratio ranges.

It is a further object of this invention to provide a new and improved output split-type mechanical and hydraulic transmission having a high degree of design flexibility for establishing the plurality of input-output speed ratio ranges in accordance with predetermined requirements.

Another object of this invention is to provide a new and improved transmission of the above-described type wherein each input-output speed ratio range is continuous to make possible a continuous variable drive ratio.

Another object of this invention is to provide a new and improved transmission of the above-described type which has clutch and brake means for establishing the plurality of input-output speed ratio ranges that are synchronized on the border of adjoining input-output speed ratio ranges, thus decreasing the size and capacity of the conventional clutch and brake means.

Another object of this invention is to provide a new and improved transmission of the above-described type which minimizes size, weight and manufacturing cost by employing a commonly used differential gear mechanism for establishing the plurality of input-output speed ratio ranges.

Still another object of this invention is to provide a new and improved transmission of the above-described type wherein the components of the differential gear mechanisms have rotational speeds maintained within practical limitations thereof.

A further object of this invention is to provide a new and improved transmission of the above-described type which minimizes a countershaft-type speed-reducing element for decreasing bearing-receiving radial loads.

Finally, it is an object of this invention to provide a highly simplified output split-type mechanical and hydraulic transmission which is small in size, and low in weight and manufacturing cost, while transmitting maximum and continuous drive power.

Additional objects and advantages of the invention will be set forth in part in the description which follows, and in part will be obvious from the description, or may be learned by practice of the invention. The objects and advantages of the invention may be realized and attained by means of the instrumentalities and combinations particularly pointed out in the appended claims.

To achieve the foregoing objects and in accordance with the purpose of the invention, as embodied and broadly described herein, the output split-type mechanical and hydraulic transmission of this invention comprises: (1) an input shaft; (2) an output shaft; (3) an intermediate shaft; (4) differential gear means for establishing different input-output speed ratios, the differential gear means having at least one component mechanically connected to the input shaft, one component mechanically connected to the intermediate shaft, and one component mechanically connected to the output shaft; (5) clutch means for selectively cooperating with components of the differential gear means, the input shaft, the intermediate shaft, and the output shaft to establish different input-output speed ratio ranges; and (6) first and second hydraulic pump motor means hydraulically connected to each other, at least the first pump motor means having a variable hydraulic capacity and being mechanically and driveably connected to the input shaft for establishing variations in the hydraulic capacity, and at least the second pump motor means being mechanically connected to at least one component of the differential gear means for establishing rotational speeds of the components of the differential gear means during the different input-output speed ratio ranges in relationship to the variations of the hydraulic capacity of at least the first pump motor means.

It is preferred that the output split-type mechanical and hydraulic transmission include a first differential gear mechanism having at least four elements, the first element being connected to the input shaft, the second element being connected to the second pump motor, and the third and fourth elements being selectively engageable with the intermediate shaft by the clutch means, and a second differential gear mechanism having at least three elements, the first element being connected to the input shaft, the second element being connected to the intermediate shaft, and the third element being connected to the output shaft.

It is further preferred that the clutch means of the output split-type mechanical and hydraulic transmission selectively connect and disconnect the intermediate shaft and the second element of the second differential gear mechanism with the output shaft.

Finally it is preferred that the output split-type mechanical and hydraulic transmission have the differential gear mechanisms, and the intermediate and output shafts coaxially arranged with the input shaft, and the hydraulic pump motors including rotational shafts parallel to the input shaft.

The accompanying drawings, which are incorporated in and constitute a part of this specification, illustrate several embodiments of the invention and, together with the description, serve to explain the principles of the invention.

DETAILED DESCRIPTION OF THE DRAWINGS

Reference will now be made in detail to the present preferred embodiments of the invention, examples of which are illustrated in the accompanying drawings.

Figures 1, 2:
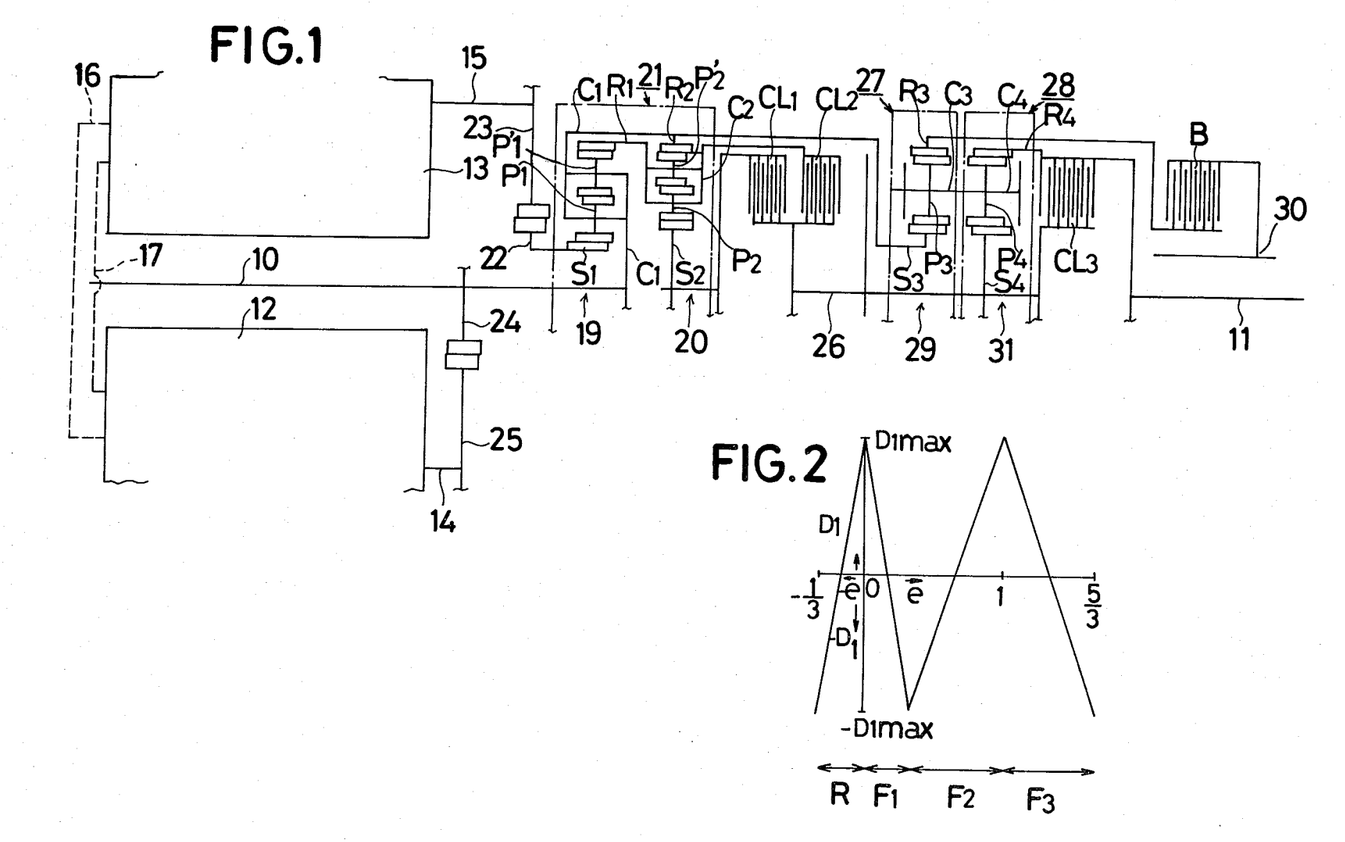
FIG. 1 is a schematic drawing of one embodiment of the output split-type mechanical and hydraulic transmission employing the teachings of this invention.
FIG. 2 is a graph illustrating the relationship between a hydraulic capacity D1 of the first hydraulic pump motor and an input-output speed ratio e for the embodiment of the transmission, in accordance with this invention, shown in FIG. 1.

Referring now to FIG. 1, there is shown a first preferred embodiment of an output split-type mechanical and hydraulic transmission employing the teachings of this invention. In accordance with the invention, the transmission includes an input shaft 10, an intermediate shaft 26, and an output shaft 11. As herein embodied, the intermediate shaft 26 and the output shaft 11 are coaxially arranged with the input shaft 10.

In accordance with the invention, the transmission further comprises first and second hydraulic pump motors 12 and 13, respectively, which are hydraulically connected to each other. As herein embodied, the first and second pump motors 12 and 13 are hydraulically connected to each other by the conduits 16 and 17. In accordance with the invention, at least the first pump motor 12 has a variable hydraulic capacity and is mechanically connected to the input shaft 10. As herein embodied, the second pump motor 13 has a fixed hydraulic capacity D2. It is preferred that the first and second hydraulic pump motors 12 and 13 be axial piston-type pump motors wherein the hydraulic capacity D1 of the first pump motor 12 is variable from D1 MAX to −D1 MAX and, at its maximum output, is equivalent to the hydraulic capacity D2 of the second pump motor 13.

As herein embodied and as shown in FIG. 1, the first and second hydraulic pump motors 12 and 13 have rotational shafts 14 and 15, respectively, parallel to the input shaft 10. Preferably, the rotational shaft 14 of the first hydraulic pump motor 12 is driveably connected to the input shaft 10 by a set of gears 24 and 25.

In accordance with the invention, the transmission further comprises a first differential gear mechanism 21 as shown in FIG. 1. As herein embodied, the first differential gear mechanism 21 includes at least four elements, the first element being connected to the input shaft 10, the second element being connected to the second pump motor 13, and the third and fourth elements being selectively engageable with the intermediate shaft 26. Preferably, the first differential gear mechanism 21 is coaxially arranged with the input shaft 10.

As herein embodied, the first differential gear mechanism 21 comprises first and second planetary gears 19 and 20, respectively. Preferably, the first planetary gear 19 includes a sun gear S1, a first pinion P1 meshed with the sun gear S1, a second pinion P'1 meshed with the first pinion P1, a ring gear R1 meshed with the second pinion P'1, and a carrier C1 rotatably supporting the first and second pinions P1 and P'1. The second planetary gear 20 includes a sun gear S2, a first pinion P2 meshed with the sun gear S2, a second pinion P'2 meshed with the first pinion P2, a ring gear R2 meshed with the second pinion P'2, and a carrier C2 rotatably supporting the first and second pinions P2 and P'2.

As herein embodied and as shown in FIG. 1, the carrier C1 of the first planetary gear 19 and the ring gear R2 of the second planetary gear 20 are integrally connected to each other and to the input shaft 10 and comprise the first element of the first differential gear mechanism 21.

As herein embodied, the sun gear S1 of the first planetary gear 19 is mechanically connected to the second pump motor 13 and comprises the second element of the first differential gear mechanism 21. Preferably, the sun gear S1 is connected to the rotational shaft 15 of the second hydraulic pump motor 13 by a set of gears 22 and 23 as shown in FIG. 1.

As herein embodied and as shown in FIG. 1, the ring gear R1 of the first planetary gear 19 and the carrier C2 of the second planetary gear 20 are integrally connected to each other and comprise the third element of the first differential gear mechanism 21. The ring gear R1 and the carrier C2 are also selectively engageable with the intermediate shaft 26.

As herein embodied and as shown in FIG. 1, the sun gear S2 of the second planetary gear 20 is selectively engageable with the intermediate shaft 26 and comprises the fourth element of the first differential gear mechanism 21.

In accordance with the invention, the transmission further comprises clutch means for selectively engaging the third and fourth elements of the first differential gear mechanism 21 to the intermediate shaft 26. As herein embodied and as shown in FIG. 1, a first clutch CL1 is provided on the outer surface of the intermediate shaft 26 for selectively engaging or disengaging the sun gear S2 (the fourth element) of the first differential gear mechanism 21 with the intermediate shaft 26. A second clutch CL2 is provided on the outer surface of the intermediate shaft 26 for selectively engaging or disengaging the ring gear R1 and carrier C2 (the third element) of the first differential gear mechanism 21 with the intermediate shaft 26.

As herein embodied and as shown in FIG. 1, the transmission further comprises a speed-reducing mechanism 27 having a third planetary gear 29. Preferably, the third planetary gear 29 includes a sun gear S3 integrally connected to the carrier C1 and the ring gear R2 of the first differential gear mechanism 21, a ring gear R3 selectively affixed from rotation, a pinion P3 meshed with the ring gear R3 and the sun gear S3, and a carrier C3 rotatably supporting the pinion P3. As shown in FIG. 1, it is preferred that the speed-reducing mechanism 27 be located on the outer surface of the intermediate shaft 26.

It is further preferred that a brake means B be provided for selectively engaging the ring gear R3 of the speed-reducing mechanism 27 for affixing the ring gear R3 from rotation thereof. As shown in FIG. 1, ring gear R3 is connected or disconnected to a case 30 by the selective engagement of the brake means B. Accordingly, the speed-reducing mechanism 27 is operated by engagement of the brake means B to provide power transmission. Likewise, the speed-reducing mechanism 27 is not operated to provide power transmission by the disengagement of the brake means B.

In accordance with the invention, the transmission further comprises a second differential gear mechanism 28 as shown in FIG. 1. As herein embodied, the second differential gear mechanism 28 includes at least three elements, the first element being connected to the input shaft 10, the second element being connected to the intermediate shaft 26, and the third element being connected to the output shaft 11. Preferably, the second differential gear mechanism 28 is located on the outer surface of the intermediate shaft 26.

As herein embodied, the second differential gear mechanism 28 comprises a fourth planetary gear 31. Preferably, the fourth planetary gear 31 includes a sun gear S4, a ring gear R4, a pinion P4 meshed with the ring gear R4 and the sun gear S4, and a carrier C4 rotatably supporting the pinion P4.

As herein embodied and as shown in FIG. 1, the carrier C4 of the fourth planetary gear 31 is integrally connected to the carrier C3 of the speed-reducing mechanism 27 and comprises the first element of the second differential gear mechanism 28. The sun gear S4 of the fourth planetary gear 31 is integrally connected to the intermediate shaft 26 and comprises the second element of the second differential gear mechanism 28. The ring gear R4 of the fourth planetary gear 31 is integrally connected to the output shaft 11 and comprises the third element of the second differential gear mechanism 28.

As herein embodied, the transmission further comprises clutch means for selectively connecting and disconnecting the intermediate shaft 26 and the second element of the second differential gear mechanism 28 with the output shaft 11. As shown in FIG. 1, it is preferred that a clutch CL3 be provided on the outer surface of the intermediate shaft 26 for selectively connecting and disconnecting the intermediate shaft 26 and the sun gear S4 (the second element) with the output shaft 11. Upon engagement of the clutch CL3, the second differential gear mechanism is locked by providing synchronized rotation of the sun gear S4 and the ring gear R4 of the second differential gear mechanism 28.

It is preferred that the clutches CL1, CL2, CL3 and the brake means B be of a frictional type which is hydraulically actuated.

In the first preferred embodiment of the transmission shown in FIG. 1, it is preferred that the ratio of the pitch circle diameter of the ring gear to sun gear of the first planetary gear 19 (R1/S1) be 3:1, and the ratios of the ring gear to sun gear of the second, third and fourth planetary gears 20, 29, and 31 (R2/S2, R3/S3, R4/S4) be 2:1. It is further preferred that the ratios of the pitch circle diameter of the gear 23 to gear 22 and gear 25 to gear 24 be the same.

Figure 3:
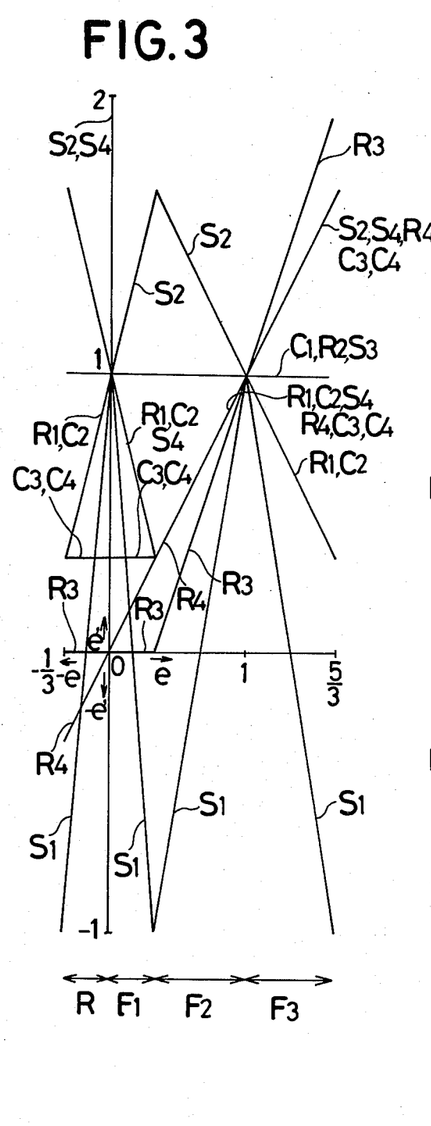
FIG. 3 is a graph illustrating the relationship between the rotational speed ratio e' of planetary gear components (ring gears, sun gears, and carriers) to the input shaft and the input-output speed ratio e for the embodiment of the transmission, in accordance with this invention, shown in FIG. 1.
Figure 4:
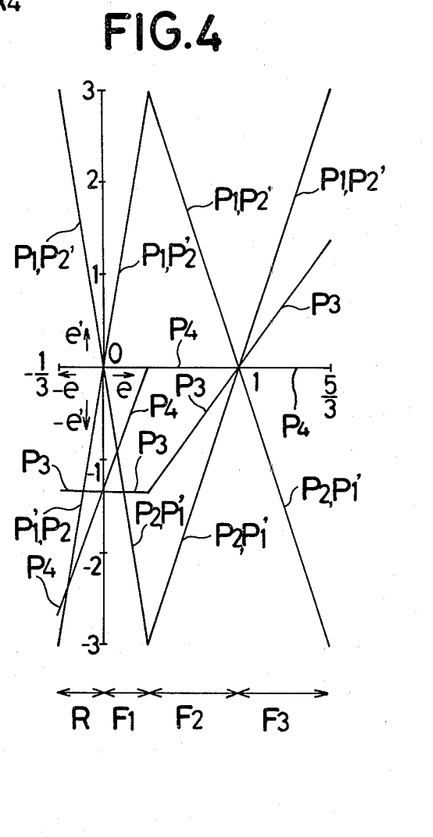
FIG. 4 is a graph illustrating the relationship between the rotational speed ratio e' of planetary gear components (pinions) to the input shaft and the input-output speed ratio e for the embodiment of the transmission, in accordance with this invention, shown in FIG. 1.

Further reference is now made to FIGS. 2-4, to describe in detail the operation of the transmission as embodied and shown in FIG. 1. For purposes of explanation of the operation of this transmission, the rotational speed of the input shaft 10 remains fixed and there is no hydraulic leakage between the first and second hydraulic pump motors 12 and 13.

To establish the first forward input-output speed ratio range F1, the brake means B and the second clutch CL2 are engaged. At the initial establishment of the first forward speed range F1, the hydraulic capacity D1 of the first hydraulic pump motor 12 is set at D1 MAX, as best seen in FIG. 2. Therefore, because of the relationship in the hydraulic capacities of the first and second hydraulic pump motors 12 and 13, the shaft 15 of the second hydraulic pump motor 13 has the same rotational speed as the shaft 14 of the first hydraulic pump motor 12. Since the sun gear S1 is mechanically connected with the second pump motor 13 and the carrier C1 is mechanically connected to the input shaft 10, the sun gear S1 has the same rotational speed ratio $e'$ to the input shaft 10 as the carrier C1. In a similar fashion, the ring gear R2, the sun gear S3, the ring gear R1, the carrier C2, the intermediate shaft 26, and the sun gear S4 have the same rotational speed ratio $e'$ as that of the sun gear S1 and the carrier C1. However, because the carriers C3 and C4 are rotated at a speed ratio of 1:3 to carrier C1, the ring gear R4 and the output shaft 11 are not rotated. Accordingly, the rotational speed ratio $e'$ of the ring gear R4 and the input-output speed ratio $e$ are 0.

The hydraulic capacity of the first pump motor 12 in relationship to the input-output speed ratio $e$ during the different speed ranges is best illustrated in FIG. 2. The rotational speed ratios $e'$ of the various components of the first and second differential gear mechanisms 21 and 28 and the speed-reducing mechanism 27 to the input shaft 10 in relationship to the input-output speed ratio $e$ during the different speed ranges are best illustrated in FIGS. 3 and 4.

When the hydraulic capacity D1 of the first pump motor 12 is continuously varied from D1 MAX to −D1 MAX during the first forward speed range F1, the rotational speed of the shaft 15 of the second hydraulic pump motor 13 is continuously increased. Since the rotational speed of the sun gear S1 is continuously decreased, the rotational speed of the ring gear R4 is continuously increased. Accordingly, the rotational speed of the output shaft 11 is continuously increased, thus continuously increasing the input-output speed ratio $e$. As the hydraulic capacity D1 of the first hydraulic pump motor 12 is varied during the first forward speed range F1, the input-output speed ratio e can be continuously varied from 0 to ⅓.

To further increase the input-output speed ratio e, the third clutch CL3 is engaged and the brake means B is disengaged, while the second clutch CL2 remains engaged. This selective engagement and disengagement of the clutches and brake means changes the transmission from the first forward speed range F1 to the second forward input-output speed ratio range F2. At the establishment of the second forward speed range F2, the rotataional speed of the sun gear S4 is initially synchronized with the ring gear R4 because of the selective connection by the clutch CL3 of the intermediate shaft 26 and the sun gear S4 to the output shaft 11 and the ring gear R4.

When the hydraulic capacity D1 of the first hydraulic pump motor 12 is continuously varied from $-D1$ MAX to D1 MAX during the second forward speed range F2 as shown in FIG. 2, the input-output speed ratio e continuously increased. As the hydraulic capacity of the first hydraulic pump motor 12 is varied, the rotational speed of the shaft 15 of the second hydraulic pump motor 13 is continuously decreased. Since the rotational speed of the sun gear S1 is continuously increased, the rotational speed of the output shaft 11 is continuously increased, thus continuously increasing the input-output speed ratio e. As the hydraulic capacity of the first hydraulic pump motor 12 is varied during the second forward speed range F2, the input-output speed ratio e can be continuously varied from ⅓ to 1.0.

To further increase the input-output speed ratio e, the first clutch CL1 is engaged and the second clutch CL2 is disengaged, while the third clutch CL3 remains engaged. This selective engagement and disengagement of the different clutches changes the transmission from the second forward speed range F2 to the third forward input-output speed ratio range F3. At the establishment of the third forward speed range F3, the rotational speed of the sun gear S2 is initially synchronized with the rotational speed of the ring gear R1 and the carrier C2 because of the selective connection by the clutch CL1 of the sun gear S2 with the intermediate shaft 26.

When the hydraulic capacity D1 of the first hydraulic pump motor 12 is continuously varied from D1 MAX to $-D1$ MAX during the third forward speed range F3 as shown in FIG. 2, the input-output speed ratio e continuously increases. As the hydraulic capacity of the first hydraulic pump motor 12 is varied, the rotational speed of the second hydraulic pump motor 13 is continuously increased. Since the rotational speed of the sun gear S1 is continuously decreased, the rotational speed of the ring gear R4 is continuously increased. Accordingly, the rotational speed of the output shaft 11 is continuously increased, thus continuously increasing the input-output speed ratio e. As the hydraulic capacity D1 of the first hydraulic pump motor 12 is varied during the third forward speed range F3, the input-output speed ratio e can be continuously varied from 1.0 to 5/3.

In a similar fashion, during the operation of the transmission when a change is made from the third forward speed range F3 to the first forward speed range F1, the input-output speed ratio e can be continuously varied from 5/3 to 0.

To change the transmission from the first forward speed range F1 to a reverse input-output speed ratio range R, the clutch CL1 is engaged and the clutch CL2 is disengaged while the brake means B remains engaged from the first forward speed range F1. At the establishment of the reverse speed range R, the rotational speed of the sun gear S2 is initially synchronized with the rotational speed of the ring gear R1 and the carrier C2 because of the selective connection by the clutch CL1 of the sun gear S2 to the intermediate shaft 26.

When the hydraulic capacity D1 of the first hydraulic pump motor 12 is continuously varied from D1 MAX to $-D1$ MAX during the reverse speed range R as shown in FIG. 2, the input-output speed ratio e continuously decreases. As the hydraulic capacity of the first hydraulic pump motor 12 is varied, the rotational speed of the shaft 15 of the second hydraulic pump motor 13 is continuously increased. Since the rotational speed of the sun gear S1 is continuously decreased, the ring gear R4 is continuously decreased. Accordingly, the rotational speed of the output shaft 11 is continuously decreased, thus continuously decreasing the input-output speed ratio e.

As the hydraulic capacity D1 of the first hydraulic pump motor 12 is varied during the reverse speed range R, the input-output speed ratio e can be continuously varied from 0 to $-⅓$.

Operational results as described above for the first preferred embodiment of this transmission can be obtained also by having the ring gear R3 fixedly connected to the case 30, and the ring gear R4 and the output shaft 11 selectively engaged by clutch means. Alternatively, the sun gear S4 and the intermediate shaft 26 can be selectively engaged by clutch means.

Figures 5, 6:
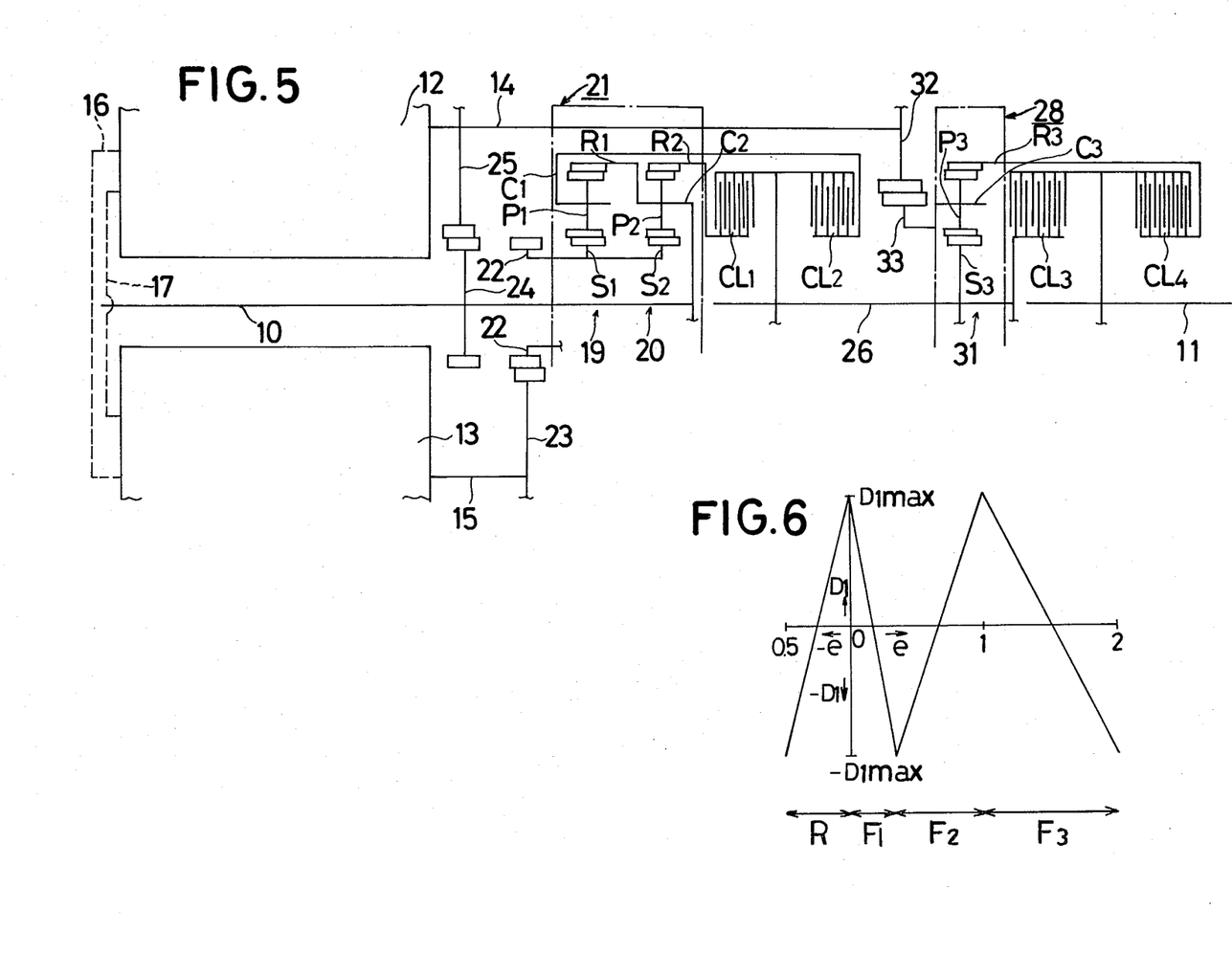
FIG. 5 is a schematic drawing of a second embodiment of the output split-type mechanical and hydraulic transmission employing the teachings of this invention.
FIG. 6 is a graph illustrating the relationship between a hydraulic capacity D1 of the first hydraulic pump motor and an input-output speed ratio e for the embodiment of the transmission, in accordance with this invention, shown in FIG. 5.

Referring now to FIG. 5, there is shown a second preferred embodiment of an output split-type mechanical and hydraulic transmission employing the teachings of this invention. The same reference numerals are used to describe similar elements for this second embodiment as those described and shown in the first preferred embodiment of FIG. 1. In accordance with the invention, the transmission includes an input shaft 10, an intermediate shaft 26, and an output shaft 11. As herein embodied, the intermediate shaft 26 and the output shaft 11 are coaxially arranged with the input shaft 10.

In accordance with the invention, the transmission further comprises first and second pump motors 12 and 13, respectively, which are hydraulically connected to each other. As herein embodied, the first and second pump motors 12 and 13 are hydraulically connected to each other by the conduits 16 and 17. In accordance with the invention, at least the first pump motor 12 has a variable hydraulic capacity and is mechanically connected to the input shaft 10. As herein embodied, the second hydraulic pump motor 13 has a fixed hydraulic capacity. It is preferred that the first and second hydraulic pump motors 12 and 13 be axial piston-type pump motors wherein the hydraulic capacity D1 of the first pump motor 12 is variable from D1 MAX to $-D1$ MAX and is equivalent, at its maximum output, to the hydraulic capacity D2 of the second pump motor 13.

As herein embodied and as shown in FIG. 5, the first and second hydraulic pump motors 12 and 13 have rotational shafts 14 and 15, respectively, parallel to the input shaft 10. Preferably, the rotational shaft 14 of the first hydraulic pump motor 12 is driveably connected to the input shaft 10 by a set of gears 24 and 25.

In accordance with the invention, the transmission further comprises a first differential gear mechanism 21 as shown in FIG. 5. As herein embodied, the first differential gear 21 includes at least four elements, the first element being connected to the input shaft 10, the second element being connected to the second pump motor 13, and the third and fourth elements being selectively engageable with the intermediate shaft 26. Preferably, the first differential gear mechanism 21 is coaxially arranged with the input shaft 10.

As herein embodied, the first differential gear mechanism 21 comprises first and second planetary gears 19 and 20. As shown in FIG. 5, the first planetary gear 19 preferably includes a sun gear S1, a ring gear R1, a pinion P1 meshed with the sun gear S1 and the ring gear R1, and a carrier C1 rotatably supporting the pinion P1. The second planetary gear 20 includes a sun gear S2, a ring gear R2, a pinion P2 meshed with the sun gear S2 and the ring gear R2, and a carrier C2 rotatably supporting the pinion P2.

As herein embodied and shown in FIG. 5, the ring gear R1 of the first planetary gear 19 and the carrier C2 of the second planetary gear 20 are integrally connected to each other and to the input shaft 10 and comprise the first element of the first differential gear mechanism 21.

As herein embodied, the sun gear S1 of the first planetary gear 19 and the sun gear S2 of the second planetary gear 20 are integrally connected to each other and comprise the second element of the first differential gear mechanism 21. Preferably, the sun gears S1 and S2 are connected to the rotational shaft 15 of the second hydraulic pump motor 13 by a set of gears 22 and 23 as shown in FIG. 5.

As herein embodied and as shown in FIG. 5, the carrier C1 of the first planetary gear 19 is selectively engageable with the intermediate shaft 26 and comprises the third element of the first differential gear mechanism 21.

As herein embodied and as shown in FIG. 5, the ring gear R2 of the second planetary gear 20 is selectively engageable with the intermediate shaft 26 and comprises the fourth element of the first differential gear mechanism 21.

In accordance with the invention, the transmission further comprises clutch means for selectively engaging the third and fourth elements of the first differential mechanism 21 to the intermediate shaft 26. As herein embodied and as shown in FIG. 5, a first clutch CL1 is provided on the outer surface of the intermediate shaft 26 for selectively engaging or disengaging the ring gear R2 (the fourth element) with the intermediate shaft 26. A second clutch means CL2 is provided on the outer surface of the intermediate shaft 26 for selectively engaging and disengaging the carrier C1 (the third element) with the intermediate shaft 26.

In accordance with the invention, the transmission further comprises a second differential gear mechanism 28 as shown in FIG. 5. As herein embodied, the second differential gear mechanism 28 includes at least three elements, the first element being connected to the input shaft 10, the second element being connected to the intermediate shaft 26, and the third element being connected to the output shaft 11. Preferably, the second differential gear mechanism 28 is located on the outer surface of the intermediate shaft 26.

As herein embodied, the second differential gear mechanism 28 comprises a third planetary gear 31. Preferably, the third planetary gear 31 includes a sun gear S3, a ring gear R3, a pinion P3 meshed with the ring gear R3 and the sun gear S3, and a carrier C3 rotatably supporting the pinion P3.

As herein embodied and as shown in FIG. 5, carrier C3 of the third planetary gear 31 is mechanically connected to the input shaft 10 and comprises the first element of the second differential gear mechanism 28. Preferably, the carrier C3 is connected to the rotational shaft 14 of the first hydraulic pump motor 12 by a set of gears 32 and 33 with the rotational shaft 14 being connected to the input shaft 10 by the gears 24 and 25. The sun gear S3 of the third planetary gear 31 is integrally connected to the intermediate shaft 26 and comprises the second element of the second differential gear mechanism 28. The ring gear R3 of the third planetary gear 31 is selectively connected and disconnected to the output shaft 11 and comprises the third element of the second differential gear mechanism 28. Preferably, a clutch CL4 is provided for selectively connecting and disconnecting the ring gear R3 with the output shaft 11.

As herein embodied, the transmission further comprises clutch means for selectively connecting and disconnecting the intermediate shaft 26 and the second element of the second differential gear mechanism 28 with the output shaft 11. As shown in FIG. 5, it is preferred that a clutch CL3 be provided on the outer surface of the intermediate shaft 26 for selectively connecting and disconnecting the intermediate shaft 26 and the sun gear S3 (the second element) with the output shaft 11.

Figure 7:
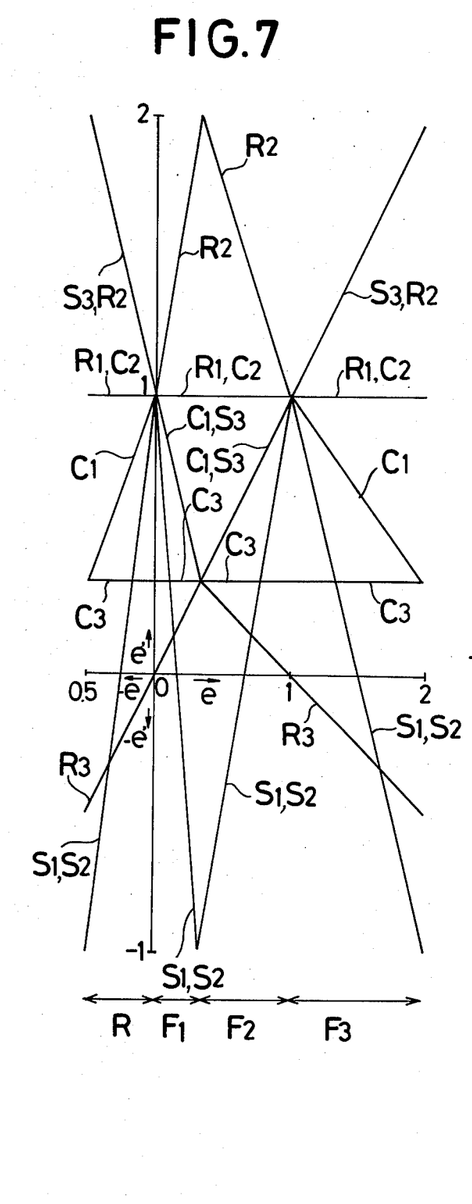
FIG. 7 is a graph illustrating the relationship between the rotational speed ratio e' of planetary gear components (ring gears, sun gears, and carriers) to the input shaft and the input-output speed ratio e for the embodiment of the transmission, in accordance with this invention, shown in FIG. 5.
Figure 8:
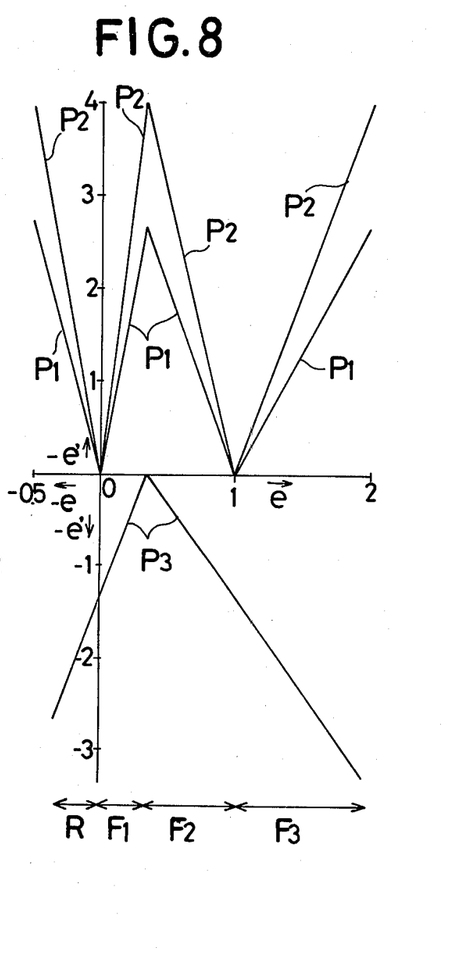
FIG. 8 is a graph illustrating the relationship between the rotational speed ratio e' of planetary gear components (pinions) to the input shaft and the input-output speed ratio e for the embodiment of the transmission, in accordance with this invention, shown in FIG. 5.

Further reference is made to FIGS. 6-8 to illustrate the operation of the transmission as embodied and shown in FIG. 5. To establish the first forward input-output speed ratio range F1 during operation of the transmission, the clutches CL2 and CL4 are engaged. To establish the second forward input-output speed ratio range F2, the clutches CL2 and CL3 are engaged while the clutches CL1 and CL4 are disengaged. To establish the third forward input-output speed ratio range F3, the clutches CL1 and CL3 are engaged while the clutches CL2 and CL4 are disengaged. To establish the reverse input-output speed ratio range R, the clutches CL1 and CL4 are engaged while the clutches CL2 and CL3 are disengaged.

When the hydraulic capacity D1 of the first hydraulic pump motor 12 is continuously varied during each of the above-mentioned input-output speed ratio ranges F1, F2, F3 and R, the input-output speed ratio e is also continuously varied. The hydraulic capacity D1 of the first pump motor 12 in relationship to the speed ratio e during the different speed ranges is best illustrated in FIG. 6. The rotational speed ratio e' of the various components of the first and second differential gear mechanisms 21 and 28 to the input shaft 10 in relationship to the input-output speed ratio e are best illustrated in FIGS. 7 and 8. During the operation of this second preferred embodiment of the invention, the input-output speed ratio e can be continuously varied within the range of 0.5 to 2.0. Accordingly, the results achieved by the second embodiment of this invention are similar to that of the first embodiment of this invention.

Operational results as described above for the second preferred embodiment of this transmission can be obtained also by having the ring gear R3 and the output shaft 11 integrally connected to each other and the sun gear S3 and the intermediate shaft 26 being selectively engaged and disengaged by a clutch. Alternatively, the carrier C3 and the rotational shaft 14 of the first hydraulic pump motor 12 can be selectively engaged or disengaged by a clutch.

It will be apparent to those skilled in the art that various modifications and variations could be made in the output split-type mechanical and hydraulic transmission without departing from the scope or spirit of the invention.

What is claimed is:

1. The output split-type mechanical and hydraulic transmission comprising:
   (a) an input shaft;
   (b) an output shaft;
   (c) an intermediate shaft;
   (d) first and second hydraulic pump motors hydraulically connected to each other, and at least said first pump motor having a variable hydraulic capacity and being mechanically connected to said input shaft;
   (e) a first differential gear mechanism having first and second planetary gears, each of said planetary gears comprising a sun gear, a ring gear, a pinion meshed with said sun gear and said ring gear thereof, and a carrier rotatably supporting said pinion thereof, and wherein said carrier of said second planetary gear is integrally connected to said input shaft and to said ring gear of said first planetary gear, said sun gears of said first and second planetary gears are integrally connected to each other and mechanically connected to said second hydraulic pump motor, and said carrier of said first planetary gear and said ring gear of said second planetary gear are selectively connected to said intermediate shaft;
   (f) a second differential gear mechanism having third planetary gear with a sun gear, a ring gear, a pinion meshed with said ring gear and said sun gear thereof, and a carrier rotatably supporting said pinion thereof, and wherein said carrier of said third planetary gear is mechanically connected to said first hydraulic pump motor, said sun gear of said third planetary gear is integrally connected to said intermediate shaft, and said ring gear is selectively connected to said output shaft; and
   (g) clutch means for selectively connecting and disconnecting said ring gear of said second planetary gear to said intermediate shaft, said carrier of said first planetary gear to said intermediate shaft, said intermediate shaft to said output shaft, and said ring gear of said third planetary gear to said output shaft.

2. The output split-type mechanical and hydraulic transmission as set forth in claim 1, wherein the ratio of the pitch circle diameter of said ring gear to sun gear of said first, second, and third planetary gears is 2:1.

3. The output split-type mechanical and hydraulic transmission as set forth in claim 1, wherein said output shaft, said intermediate shaft, and said first differential gear mechanism are coaxially arranged with said input shaft, and wherein said first and second hydraulic pump motors have rotational shafts parallel to said input shaft.

4. The output split-type mechanical and hydraulic transmission as set forth in claim 3, further comprising first, second, and third pairs of gears for mechanically connecting, respectively, said rotational shaft of said first hydraulic pump motor to said input shaft, said rotational shaft of said second hydraulic pump motor to said sun gears of said first and second planetary gears, and said rotational shaft of said first hydraulic pump motor to said carrier of said third planetary gear, and wherein the ratio of the pitch circle diameter of said first, second, and third pairs of gears is the same.

5. An output split-type mechanical and hydraulic transmission, comprising:
   (a) an input shaft;
   (b) an output shaft;
   (c) an intermediate shaft;
   (d) first and second hydraulic pump motors hydraulically connected to each other, and at least said first pump motor having a variable hydraulic capacity and being mechanically connected to said input shaft;
   (e) a first epicyclic differential gear mechanism including at least four elements and comprising at least first and second planetary gears, each of said planetary gears having three components,
      1. the first element thereof being drivingly connected to said input shaft and comprising one component of the first planetary gear and one component of the second planetary gear;
      2. the second element thereof being drivingly connected to said second pump motor and comprising another component of the first planetary gear;
      3. the third element being selectively engageable with said intermediate shaft and comprising the remaining component of the first planetary gear; and
      4. the fourth element thereof being selectively engageable with said intermediate shaft and comprising another component of the second planetary gear;
   (f) first clutch means for selectively engaging said third and fourth elements of said first differential gear mechanism to said intermediate shaft; and
   (g) a second epicyclic differential gear mechanism including at last three elements and comprising at least a third planetary gear having three components,
      1. the first element thereof being drivingly connected to the input shaft and comprising one component of the third planetary gear;
      2. the second element thereof being drivingly connected to the intermediate shaft and comprising another component of the third planetary gear; and
      3. the third element thereof being connected to the output shaft and comprising the remaining component of the third planetary gear.

6. An output split-type mechanical and hydraulic transmission as set forth in claim 5, further comprising second clutch means for selectively connecting and disconnecting said intermediate shaft and said output shaft.

7. The output split-type mechanical and hydraulic transmission as in claim 6,
   (a) wherein each of said planetary gears of said first differential gear mechanism comprises a sun gear, a ring gear a pinion meshed with said sun gear and said ring gear, and a carrier rotatably supporting said pinion, and wherein said first element of said first differential gear mechanism comprises the ring gear of said first planetary gear integrally connected with said carrier of said second planetary gear, said first element being integrally connected to said input shaft, said second element comprises the sun gear of said first planetary gear; said third element comprises said carrier of said first planetary gear selectively engageable with said intermediate shaft, and wherein said fourth element comprises the ring gear of said second planetary gear; selectively engageable with said intermediate shaft;

(b) wherein the third planetary gear includes a sun gear, a ring gear, a pinion meshed with said ring gear and said sun gear, and a carrier rotatably supporting said pinion thereof, and wherein said first element of the second differential gear mechanism comprises said carrier mechanically connected to said input shaft, said second element comprises said sun gear integrally connected with said intermediate shaft, and said third element comprises said ring gear (c) wherein said transmission also includes clutch means for selectively connecting and disconnecting the ring gear of said third planetary gear with said output shaft.

8. The output split-type mechanical and hydraulic transmission as in claim 6
   (a) wherein each of said planetary gears of said first differential mechansim comprises a sun gear, a first pinion meshed with said sun gear, a second pinion meshed with said first pinion, a ring gear meshed with said second pinion, and a carrier rotatably supporting said first and second pinions, and wherein said first element of said first differential gear mechanism comprises the carrier of said first planetary gear integrally connected with the ring gear of said second planetary gear unit, said first element being integrally connected with said input shaft, said second element comprises the sun gear of said first planetary gear unit said third element comprises the ring gear of said first planetary gear unit integrally connected with the carrier of said second planetary gear unit and selectively engageable with said intermediate shaft, and said fourth element comprises the sun gear of said second planetary gear unit being selectively engageable with said intermediate shaft; and
   (b) wherein said third planetary gear unit includes a sun gear, a ring gear, a pinion meshed with said ring gear and said sun gear, and a carrier rotatably supporting said pinion, and wherein said first element of said second differential gear mechanism comprises said carrier of said third planetary gear mechanically connected to said input shaft, said second element comprises the sun gear integrally connected with said intermediate shaft, and said third element comprises the ring gear integrally connected with said output shaft.

9. An output split-type mechanical and hydraulic transmission comprising:
   (a) an input shaft;
   (b) an output shaft;
   (c) an intermediate shaft;
   (d) first and second hydraulic pump motors hydraulically connected to each other, and at least said first pump motor having a variable hydraulic capacity and being mechanically connected to said input shaft;
   (e) a first epicyclic differential gear mechanism including at least four elements, the first element being drivingly connected to said input shaft, the second element being drivingly connected to said second pump motor, and the third and fourth elements being selectively engageable with said intermediate shaft;
   (f) first clutch means for selectively engaging said third and fourth elements of said first differential gear mechanism to said intermediate shaft; and
   (g) a second epicyclic differential gear mechanism including at least three elements, the first element being drivingly connected to said input shaft, the second element being drivingly connected to said intermediate shaft, and the third element being connected to said output shaft.

10. An output split-type mechanical and hydraulic transmission as set forth in claim 9, further comprising second clutch means for selectively connecting and disconnecting said intermediate shaft with said output shaft.

11. The output split-type mechanical and hydraulic transmission as set forth in claim 10, wherein said second clutch means locks said second differential gear mechanism upon engagement thereof.

12. The output split-type mechanical and hydraulic transmission as set forth in claim 9, wherein said first differential gear mechanism comprises:
   (a) a first planetary gear including a sun gear mechanically connected to said second pump motor, a first pinion meshed with said sun gear, a second pinion meshed with said first pinion, a ring gear meshed with said second pinion, and a carrier rotatably supporting said first and second pinions and integrally connected to said input shaft; and
   (b) a second planetary gear including a sun gear selectively connected to said intermediate shaft, a first pinion meshed with said sun gear thereof, a second pinion meshed with said first pinion thereof, a ring gear meshed with said second pinion thereof and integrally connected to said carrier said first planetary gear, and a carrier rotatably supporting said first and second pinions thereof, integrally connected to said ring gear of said first planetary gear and both ring gears selectively connected to said intermediate shaft.

13. The output split-type mechanical and hydraulic transmission as set forth in claim 12, wherein said carrier of said first planetary gear and said ring gear of said second planetary gear comprise said first element of said first differential gear mechanism; said sun gear of first planetary gear comprises said second element of said first differential gear mechanism; said ring gear of said first planetary gear and said carrier of said second planetary gear comprise said third element of said first differential gear mechanism; and said sun gear of said second planetary gear comprises said fourth element of said first differential gear mechanism.

14. The output split-type mechanical and hydraulic transmission as set forth in claim 9, wherein said second differential gear mechanism comprises a planetary gear having a sun gear integrally connected to said intermediate shaft, a ring gear integrally connected to said output shaft, a pinion meshed with said ring gear and said sun gear thereof, and a carrier rotatably supporting said pinion thereof and mechanically connected to said input shaft.

15. The output split-type mechanical and hydraulic transmission as set forth in claim 14, wherein said carrier comprises said first element of said second differential gear apparatus; said sun gear comprises said second element of said second differential gear mechanism; and said ring gear comprises said third element of said second differential gear mechanism.

16. The output split-type mechanical and hydraulic transmission as set forth in claim 9, further comprising:
   (a) a speed-reducing mechanism having a planetary gear with a sun gear integrally connected to said first element of said first differential gear mechanism, a ring gear, a pinion meshed with said ring gear and said sun gear, and a carrier rotatably supporting said pinion and integrally connected to said first element of said second differential gear mechanism; and (b) brake means selectively engageable with said ring gear for affixing said ring gear from rotation.

17. The output split-type mechanical and hydraulic transmission as set forth in claim 10 further comprising third clutch means for selectively connecting and disconnecting said third element of said second differential gear mechanism with said output shaft.

18. The output split-type mechanical and hydraulic transmission as set forth in claim 9, wherein said first differential gear mechanism comprises:

(a) a first planetary gear including a sun gear mechanically connected to said second pump motor, a ring gear, a pinion meshed with said sun gear and said ring gear, and a carrier rotatably supporting said pinion and selectively connected to said intermediate shaft; and (b) a second planetary gear including a sun gear integrally connected to said sun gear of said first planetary gear and mechanically connected to said second pump motor, a ring gear selectively connected to said intermediate shaft, a pinion meshed with said sun gear and said ring gear thereof, and a carrier rotatably supporting said pinion thereof and integrally connected to said ring gear of said first planetary gear and to said input shaft.

19. The output split-type mechanical and hydraulic transmission as set forth in claim 18, wherein said ring gear of said first planetary gear and said carrier of said second planetary gear comprise said first element of said first differential gear mechanism; said sun gears of said first and second planetary gears comprise said second element of said first differential gear mechanism; said carrier of said first planetary gear comprises said third element of said first differential gear mechanism; and said ring gear of said second planetary gear comprises said fourth element of said first differential gear mechanism.

20. The output split-type mechanical and hydraulic transmission as set forth in claim 9, wherein second differential gear mechanism comprises a planetary gear having a sun gear integrally connected to said intermediate shaft, a ring gear selectively connected to said output shaft, a pinion meshed with said ring gear and said sun gear thereof, and a carrier rotatably supporting said pinion thereof and mechanically connected to said input shaft.

21. The output split-type mechanical and hydraulic transmission as set forth in claim 17, wherein said carrier comprises said first element of said second differential gear mechanism; said sun gear comprises said second element of said second differential gear mechanism; and said ring comprises said third element of said second differential gear mechanism.

22. The output split-type mechanical and hydraulic transmission comprising:

(a) an input shaft;
(b) an output shaft:
(c) an intermediate shaft;
(d) first and second hydraulic pump motors hydraulically connected to each other, and at least said first pump motor having a variable hydraulic capacity and being mechanically connected to said input shaft;

(e) a first differential gear mechanism having first and second planetary gears, each of said planetary gears comprising a sun gear, a first pinion meshed with said sun gear, a second pinion meshed with said first pinion, a ring gear meshed with said second pinion, and a carrier rotatably supporting said first and second pinions, and wherein said sun gear of said first planetary gear is mechanically connected to said second hydraulic pump motor, said carrier of said first planetary gear is integrally connected to said input shaft and to said ring gear of said second planetary gear, said carrier of said second planetary gear is integrally connected to said ring gear of said first planetary gear and selectively connected to said intermediate shaft, and said sun gear of said second planetary gear is selectively connected to said intermediate shaft;

(f) a speed-reducing mechanism having a third planetary gear with a sun gear, a ring gear, a pinion meshed with said ring gear and said sun gear thereof, and a carrier rotatably supporting said pinion, and wherein said sun gear of said speed-reducing mechanism is integrally connected to said carrier of said first planetary gear and said ring gear of said second planetary gear, and said ring gear of said speed-reducing mechanism is selectively affixed from rotation;

(g) a second differential gear mechanism having a fourth planetary gear with a sun gear, a ring gear, a pinion meshed with said ring gear and said sun gear thereof, and a carrier rotatably supporting said pinion thereof, and wherein said sun gear of said fourth planetary gear is integrally connected to said intermediate shaft, said carrier of said fourth planetary gear is integrally connected to said carrier of said third planetary gear, and said ring gear of said fourth planetary gear is integrally connected to said output shaft;

(h) clutch means for selectively connecting and disconnecting said carrier of said second planetary gear to said intermediate shaft, said sun gear of said second planetary gear to said intermediate shaft, and said intermediate shaft to said output shaft; and (i) brake means selectively engageable with said ring gear of said speed-reducing mechanism for affixing said ring gear thereof from rotation.

23. The output split-type mechanical and hydraulic transmission as set forth in claim 22, wherein the ratio of the pitch circle diameter of said ring gear to sun gear of said first planetary gear is 3:1 and said ring gear to sun gear of said second, third and fourth planetary gears is 2:1.

24. The output split-type mechanical and hydraulic transmission as set forth in claim 22, wherein said output shaft, said intermediate shaft, and said first differential gear mechanism are coaxially arranged with said input shaft, and wherein said first and second hydraulic pump motors have rotational shafts parallel to said input shaft.

25. The output split-type mechanical and hydraulic transmission as set forth in claim 24 further comprising first and second pairs of gears for mechanically connecting, respectively, said rotational shaft of said first hydraulic pump motor to said input shaft, and said rotational shaft of said second hydraulic pump motor to said sun gear of said first planetary gear, and wherein the ratio of the pitch circle diameter of the first and second pairs of gears is the same.

* * * * *